United States Patent
Peng et al.

(10) Patent No.: US 12,063,632 B2
(45) Date of Patent: Aug. 13, 2024

(54) RESOURCE EXCLUSION METHOD AND TERMINAL

(71) Applicant: VIVO MOBILE COMMUNICATION CO., LTD., Guangdong (CN)

(72) Inventors: Shuyan Peng, Dongguan (CN); Zichao Ji, Dongguan (CN); Shixiao Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 490 days.

(21) Appl. No.: 17/327,951

(22) Filed: May 24, 2021

(65) Prior Publication Data

US 2021/0298015 A1    Sep. 23, 2021

Related U.S. Application Data

(63) Continuation of application No. PCT/CN2019/109287, filed on Sep. 30, 2019.

(30) Foreign Application Priority Data

Nov. 27, 2018 (CN) .......................... 201811426378.2

(51) Int. Cl.
| | |
|---|---|
| H04W 72/0446 | (2023.01) |
| H04W 28/26 | (2009.01) |
| H04W 72/541 | (2023.01) |
| H04W 72/542 | (2023.01) |
| H04W 74/0808 | (2024.01) |
| H04W 92/18 | (2009.01) |

(52) U.S. Cl.
CPC ....... *H04W 72/0446* (2013.01); *H04W 28/26* (2013.01); *H04W 72/541* (2023.01);
(Continued)

(58) Field of Classification Search
CPC ........... H04W 72/0446; H04W 72/542; H04W 72/541; H04W 28/26; H04W 74/0808; H04W 92/18
See application file for complete search history.

(56) References Cited

U.S. PATENT DOCUMENTS

| | | |
|---|---|---|
| 2015/0208440 A1 | 7/2015 | Agiwal et al. |
| 2016/0066216 A1* | 3/2016 | Kim ...................... H04W 16/28 370/348 |

(Continued)

FOREIGN PATENT DOCUMENTS

| | | |
|---|---|---|
| CN | 106416411 A | 2/2017 |
| CN | 108024266 A | 5/2018 |

(Continued)

OTHER PUBLICATIONS

International Search Report and Written Opinion of the International Searching Authority regarding International Patent Application No. PCT/CN2019/109287, dated Dec. 30, 2019. Translation provided by Bohui Intellectual Property.

(Continued)

*Primary Examiner* — Chandrahas B Patel
(74) *Attorney, Agent, or Firm* — Harness, Dickey & Pierce, P.L.C.

(57) ABSTRACT

A resource exclusion method includes: determining at least one target resource, where each target resource includes at least one time domain resource; and in a case where the target resource conflicts with a reserved resource of a second terminal in time domain, performing resource exclusion based on a conflict resolution method, and determining a candidate resource of the first terminal or a reserved resource of the first terminal; where the conflict resolution method includes at least one of a conflict resolution method predefined in a protocol, a conflict resolution method preconfigured by a network, a conflict resolution method configured by a network, or a conflict resolution method configured by a terminal.

20 Claims, 7 Drawing Sheets

(52) U.S. Cl.
CPC ..... *H04W 72/542* (2023.01); *H04W 74/0808* (2013.01); *H04W 92/18* (2013.01)

(56) References Cited

U.S. PATENT DOCUMENTS

| | | |
|---|---|---|
| 2018/0249470 A1 | 8/2018 | Seo |
| 2018/0279259 A1 | 9/2018 | Gulati et al. |
| 2019/0045526 A1 | 2/2019 | Lee et al. |
| 2020/0022181 A1 | 1/2020 | Li et al. |

FOREIGN PATENT DOCUMENTS

| | | |
|---|---|---|
| CN | 108028730 A | 5/2018 |
| CN | 108271252 A | 7/2018 |
| CN | 108809603 A | 11/2018 |
| EP | 3373641 A1 | 9/2018 |

OTHER PUBLICATIONS

"Details of sensing procedure and resource (re)selection triggering mechanisms," Huawei et al., 3GPP TSG RAN WG1 Meeting #86, R1-166169, Aug. 26, 2016.

First Office Action regarding Chinese Patent Application No. 201811426378.2, dated Nov. 18, 2021. Translation provided by Bohui Intellectual Property.

Supplementary European Search Report regarding Patent Application No. 19889377.8-1215/3890394; PCT/CN2019/109287, dated Dec. 15, 2021.

"On Mode 2 Resource Allocation for NR Sidelink," Ericsson, 3GPP TSG-RAN WG1 Meeting #95, R1-1813641, dated Nov. 16, 2018.

\* cited by examiner

RESOURCE EXCLUSION METHOD AND TERMINAL

CROSS REFERENCE OF RELATED APPLICATIONS

This application is a Bypass Continuation Application of PCT/CN2019/109287 filed on Sep. 30, 2019, which claims priority to Chinese Patent Application No. 201811426378.2 filed on Nov. 27, 2018, which are incorporated herein by reference in their entirety.

TECHNICAL FIELD

The present disclosure relates to the field of communications technologies, and in particular, to a resource exclusion method and a terminal.

BACKGROUND

A sidelink is a link on which terminals directly communicate with each other without using a network. A Long Term Evolution (LTE) sidelink includes device-to-device (D2D) communication, vehicle to everything (V2X) communication, and the like. A fifth generation (5G) New Radio (NR) sidelink includes V2X communication. The sidelink supports two types of resource assignment: a scheduling resource assignment mode and a terminal-independent resource selection mode. In LTE, in the scheduling resource assignment mode, a base station configures a resource for the sidelink, and in the terminal-independent resource selection mode, a terminal periodically reserves specific resources based on a monitoring result in a period of time.

SUMMARY

Embodiments of the present disclosure provide a resource exclusion method, the resource exclusion method is applied to a first terminal, and includes:
   determining at least one target resource, where each target resource includes at least one time domain resource; and
   in a case where the target resource conflicts with a reserved resource of a second terminal in time domain, performing resource exclusion based on a conflict resolution method, and determining a candidate resource or a reserved resource of the first terminal; where
   the conflict resolution method includes at least one of a conflict resolution method predefined in a protocol, a conflict resolution method preconfigured by a network, a conflict resolution method configured by a network, or a conflict resolution method configured by a terminal.

An embodiment of the present disclosure further provides a terminal, where the terminal is a first terminal, and includes:
   a resource determining module, configured to determine at least one target resource, where each target resource includes at least one time domain resource; and
   a resource exclusion module, configured to: in a case where the target resource conflicts with a reserved resource of a second terminal in time domain, perform resource exclusion based on a conflict resolution method, and determine a candidate resource or a reserved resource of the first terminal; where
   the conflict resolution method includes at least one of a conflict resolution method predefined in a protocol, a conflict resolution method preconfigured by a network, a conflict resolution method configured by a network, or a conflict resolution method configured by a terminal.

An embodiment of the present disclosure further provides a terminal, including a processor, a memory, and a computer program that is stored in the memory and that can run on the processor, and when the computer program is executed by the processor, steps of the foregoing resource exclusion method are implemented.

An embodiment of the present disclosure further provides a non-transitory computer-readable storage medium, where the non-transitory computer-readable storage medium stores a computer program, and when the computer program is executed by a processor, steps of the foregoing resource exclusion method are implemented.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF EMBODIMENTS

Figure 1:
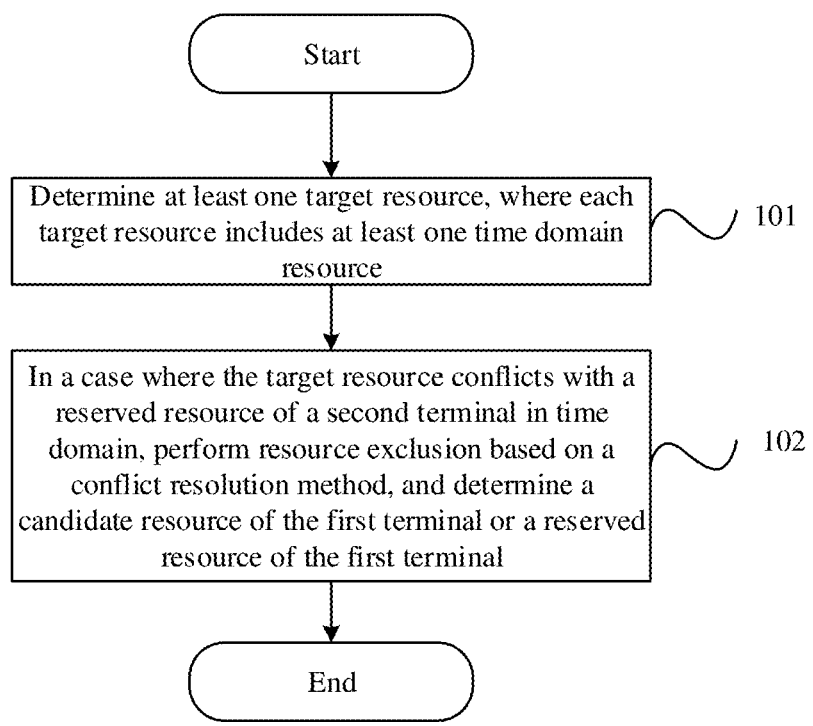
FIG. 1 is a step flowchart of a resource exclusion method according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the embodiments of the present disclosure, the term such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The LTE sidelink includes the following channels:
a physical sidelink control channel (PSCCH): a transmit terminal sends control information (for example, sidelink control information (SCI) or scheduling assignment (SA)) on the PSCCH to provide some information required for demodulating data;
a physical sidelink shared channel (PSSCH);
a physical sidelink broadcast channel (PSBCH); and
a physical sidelink discovery channel (PSDCH).

After receiving the control information, a receive terminal demodulates the control information, and determines a size of a transport block, a modulation and coding scheme, an assigned resource, and the like based on the demodulated control information. The receive terminal then receives the data on a corresponding time-frequency resource based on the information and demodulates the data.

An LTE V2X terminal-independent resource selection mode is as follows:
performing measurement in a sensing window, and demodulating an SA and performing interference measurement in each transmission time interval (TTI). The terminal excludes a resource based on the following steps:
excluding a resource of a TTI at which the terminal sends data, excluding a resource reserved for a demodulated SA, and excluding a resource with maximum interference based on an interference measurement result.

In a selection window, one subframe is randomly selected from 20% resources with minimal interference for periodical resource reservation.

In LTE V2X, support of a basic safety service is mainly considered, most of which are periodic fixed packet-sized services. A maximum end-to-end delay of a data packet is 20 ms to 1000 ms, and reliability is 96% to 99%. In the LTE V2X independent resource selection mode, a minimum resource reservation period that can be selected by the terminal is 20 ms.

A discrete Fourier transform-spreading-orthogonal frequency division multiplexing multiple access (DFT-s-OFDM) waveform is used in LTE sidelink transmission, where continuous frequency domain resources are allocated as frequency domain resources, and a time domain resource occupies one subframe (14 OFDM symbols).

In LTE V2X, only working in a frequency range 1 (FR 1) is considered. In NR V2X, working in a frequency range 2 (FR 2) needs to be considered. On an FR 2 carrier frequency, signal attenuation is relatively large, and narrow beam transmission needs to be considered. If broadcasting is supported on the FR 2, beam sweeping at a high frequency needs to be considered. Multi-slot resource scheduling needs to be considered to support beam sweeping on the FR 2.

In NR V2X, grant-free transmission may be used. To ensure transmission reliability, a multi-slot resource reservation manner may be considered, and repetition may be performed. A resource reservation mechanism defined based on one subframe is defined in LTE in a related technology. Therefore, a conflict resolution method is also defined based on one subframe. For the multi-slot resource scheduling manner, there is no conflict resolution method in the related technology.

As shown in FIG. 1, an embodiment of the present disclosure provides a resource exclusion method that is applied to a first terminal and includes the following steps:

Step 101: determine at least one target resource, where each target resource includes at least one time domain resource.

In this step, the target resource may be a candidate resource, or may be a reserved resource.

Step 102: in a case where the target resource conflicts with a reserved resource of a second terminal in time domain, perform resource exclusion based on a conflict resolution method, and determine a candidate resource of the first terminal or a reserved resource of the first terminal.

In this step, that the target resource conflicts with the reserved resource of the second terminal in time domain includes a partial conflict or an entire conflict, which is not specifically limited herein. Optionally, how to determine whether the target resource conflicts with the reserved resource of the second terminal may be obtained by detecting scheduling assignment SA, or may be obtained based on a measurement result of a sidelink. Optionally, the second terminal may be one terminal, or may be multiple terminals. In other words, the first terminal may simultaneously determine whether the first terminal conflicts with reserved resources of multiple other terminals.

Optionally, when the target resource is a candidate resource, after resource exclusion is performed based on the conflict resolution method, the candidate resource or the reserved resource of the first terminal is determined, and when the target resource is a reserved resource, after resource exclusion is performed based on the conflict resolution method, the reserved resource of the first terminal is determined.

Optionally, after the candidate resource of the first terminal is determined after resource exclusion is performed based on the conflict resolution method, the method further includes: selecting the reserved resource of the first terminal from the determined candidate resource of the first terminal. For example, at least one time domain resource is randomly selected from 20% time domain resources with minimum interference as the reserved resource of the first terminal.

It should be noted that the conflict resolution method includes at least one of a conflict resolution method predefined in a protocol, a conflict resolution method preconfigured by a network, a conflict resolution method configured by a network, or a conflict resolution method configured by a terminal.

Optionally, in the foregoing embodiment of the present disclosure, a resource granularity of the time domain resource is any one of the following:
one or more slots; for example, one time domain resource is one slot or multiple slots;
one or more subframes; for example, one time domain resource is one subframe or multiple subframes;
one or more symbols; for example, one time domain resource is one symbol or multiple symbols; and
one or more time domain patterns; for example, one time domain resource is one time domain pattern or multiple time domain patterns.

It should be noted that, when the target resource includes multiple slots, if the target resource is a reserved resource, the target resource may be considered as a reserved resource for multi-slot (multi-slot) scheduling, and if the target resource is a candidate resource, the target resource may be considered as a candidate resource for multi-slot scheduling.

Cases in which the target resource includes multiple slots are classified into the following two types:

1. The target resource includes one time domain resource, and a granularity of the time domain resource is multiple slots.
2. The target resource includes multiple time domain resources, and a granularity of the time domain resource is one slot.

Optionally, in the foregoing embodiment of the present disclosure, when resource exclusion is performed based on the conflict resolution method, a resource granularity of resource exclusion is any one of the following:

one or more slots; for example, one slot is excluded or multiple slots are excluded; one or more subframes; for example, one subframe is excluded or multiple subframes are excluded;

one or more symbols; for example, one symbol is excluded or multiple symbols are excluded;

one or more time domain patterns; for example, one time domain pattern is excluded or multiple time domain patterns are excluded;

a maximum resource granularity in a resource granularity of the reserved resource of the first terminal and a resource granularity of the reserved resource of the second terminal;

a minimum resource granularity in the resource granularity of the reserved resource of the first terminal and the resource granularity of the reserved resource of the second terminal; and the resource granularity of the reserved resource of the first terminal.

For example, the target resource includes four slots, which are respectively a slot 1, a slot 2, and a slot 3, and a slot 4, where the slot 3 conflicts with the reserved resource of the second terminal in time domain. Therefore, when performing resource exclusion, the first terminal may exclude only the conflicting slot 3, and may also exclude the four slots included in the target resource.

For another example, the resource granularity of the reserved resource of the first terminal is four slots, and the resource granularity of the reserved resource of the second terminal is one slot. When the first terminal performs resource exclusion, a resource exclusion granularity of the first terminal may be four slots, or may be one slot.

It should be noted that a resource granularity of the time domain resource and/or a resource granularity of resource exclusion may be at least one of a resource granularity specified in a protocol, a resource granularity preconfigured by a network, a resource granularity preconfigured by a terminal, a resource granularity configured by a network, or a resource granularity configured by a terminal.

In an embodiment, the performing resource exclusion based on a conflict resolution method in step 102 includes:

excluding all time domain resources included in the target resource;

or excluding a time domain resource that is in the target resource and that conflicts with the reserved resource of the second terminal; in other words, only a time domain dimension is considered, and all frequency domain resources in a conflicting time domain are excluded provided that there is a conflict in the time domain;

or excluding a time-frequency resource that is in the target resource and that conflicts with the reserved resource of the second terminal; in other words, both a time domain dimension and a frequency domain location are considered, and only a conflicting time-frequency resource is excluded.

It should be noted that the foregoing target resource is a target resource that conflicts with the reserved resource of the second terminal in time domain.

Example 1

A transmission resource preconfigured by abase station for multi-slot scheduling is four slots.

In an independent resource selection mode, a first terminal performs sensing in a sensing window, and determines a candidate resource based on a sensing result by using a slot as a granularity.

The first terminal randomly selects one resource from the candidate resource as a resource of a start slot based on the sensing result.

Figure 2:
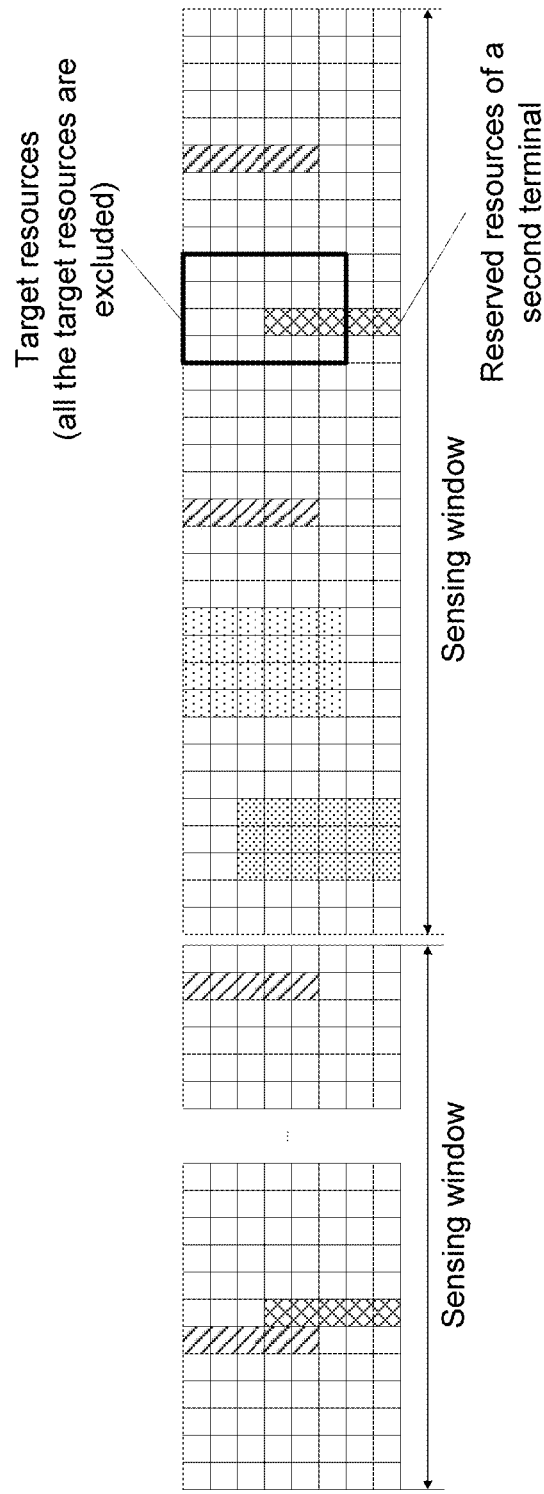
FIG. 2 is a schematic principle diagram of Example 1 in a resource exclusion method according to an embodiment of the present disclosure.

As shown in FIG. 2, the start slot is used as a reference to determine whether four consecutive slots (that is, the target resource) conflict with a reserved resource of a second terminal. If the four consecutive slots conflict with the reserved resource of the second terminal, the four slot resources are excluded from the candidate resource, and the terminal performs resource reselection.

Example 2

A transmission resource preconfigured by abase station for multi-slot scheduling is four slots.

In an independent resource selection mode, a first terminal performs sensing in a sensing window, and determines a candidate resource based on a sensing result by using a slot as a granularity.

The first terminal randomly selects one resource from the candidate resource as a resource of a start slot based on the sensing result.

Figure 3:
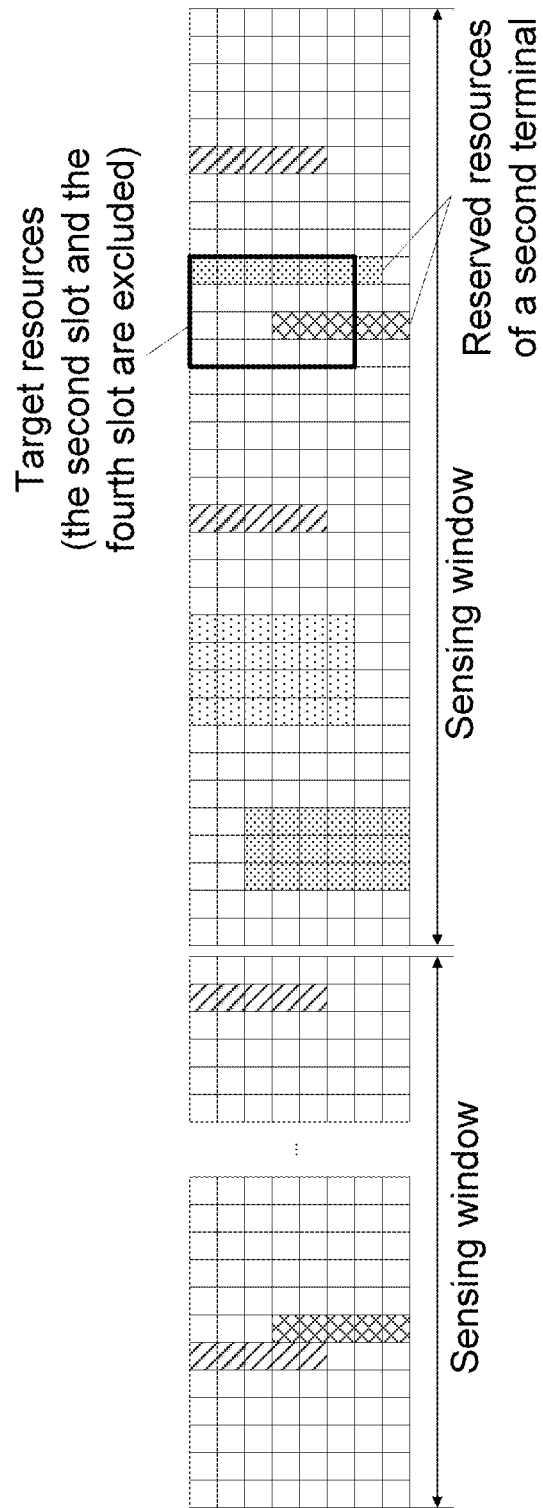
FIG. 3 is a schematic principle diagram of Example 2 in a resource exclusion method according to an embodiment of the present disclosure.

As shown in FIG. 3, the start slot is used as a reference to determine whether four consecutive slots (that is, the target resource) conflict with a reserved resource of a second terminal (the second terminal may be one terminal or multiple terminals). If the second slot and the fourth slot conflict with the reserved resource of the second terminal, the two conflicting slot resources are excluded from the candidate resource. Optionally, <the first slot, the third slot> are reserved resources of the first terminal.

In another embodiment, the performing resource exclusion based on a conflict resolution method in step 102 includes:

performing resource exclusion based on quality of service (QoS) of the target resource and QoS of the reserved resource of the second terminal.

Optionally, the performing resource exclusion based on QoS of the target resource and QoS of the reserved resource of the second terminal includes:

if the QoS (for example, a priority) of the target resource of the first terminal is lower than the QoS of the reserved resource of the second terminal, excluding all time domain resources included in the target resource, or excluding a time domain resource that is in the target resource and that conflicts with the reserved resource of the second terminal, or excluding a time-frequency resource that is in the target resource and that conflicts with the reserved resource of the second terminal.

In still another embodiment, the performing resource exclusion based on a conflict resolution method in step 102 includes:

performing resource exclusion based on a measurement result of a time domain resource that is in the target resource and that conflicts with the reserved resource of the second terminal; where
the measurement result is an interference measurement result or a channel quality measurement result.

Optionally, the performing resource exclusion based on a measurement result of a time domain resource that is in the target resource and that conflicts with the reserved resource of the second terminal includes:
in a case where the measurement result is an interference measurement result, if an interference measurement result on the conflicting time domain resource is greater than a first threshold, excluding all time domain resources included in the target resource, or excluding the conflicting time domain resource, or excluding a conflicting time-frequency resource; and
in a case where the measurement result is a channel quality measurement result, if a channel quality measurement result on the conflicting time domain resource is less than a second threshold, excluding all time domain resources included in the target resource, or excluding the conflicting time domain resource, or excluding a conflicting time-frequency resource.

The first threshold and/or the second threshold are preset values, or indicated values, or values obtained based on another parameter such as QoS (for example, a priority).

Example 3

A transmission resource preconfigured by abase station for multi-slot scheduling is four slots.

In an independent resource selection mode, a first terminal performs sensing in a sensing window, and determines a candidate resource based on a sensing result by using a slot as a granularity.

The first terminal randomly selects one resource from the candidate resource as a resource of a start slot based on the sensing result.

The start slot is used as a reference to determine whether four consecutive slots (that is, a target resource) conflicts with a reserved resource of a second terminal.

If the second slot and the fourth slot conflict with the reserved resource of the second terminal,
based on a priority (that is, QoS) of the second terminal and a priority of the first terminal in the second slot and a measurement result of the first terminal in the second slot, whether to exclude the second slot is determined.

If the priority of the second terminal is higher than that of the first terminal, a resource in the second slot is excluded, and a corresponding interference threshold is determined based on the priority of the second terminal and the priority of the first terminal. If an interference result that is of the first terminal and that is measured in the second slot is greater than the first threshold, the resource in the second slot is excluded.

Similarly, it is determined whether to exclude a resource in the fourth slot. If an interference result measured by the first terminal is less than the first threshold, the resource in the fourth slot is not excluded.

Optionally, reserved resources of the first terminal are <the first slot, the third slot, the fourth slot>.

In still another embodiment, the performing resource exclusion based on a conflict resolution method in step 102 includes:
performing resource exclusion based on a channel or a signal or a transmission type of the target resource and a channel or a signal or a transmission type of the reserved resource of the second terminal.

The channel includes a PSCCH, a PSSCH, a physical sidelink feedback channel (PSFCH), a PSDCH, or a PSBCH.

For example, a signal of the target resource or a signal of the reserved resource of the second terminal is a measurement reference signal.

A priority of the channel, the signal, or the transmission type may be specified in a protocol, preconfigured by a network, preconfigured by a terminal, configured by a network, or configured by a terminal. This is not specifically limited herein. It should be noted that a priority of the foregoing channel, signal, or transmission type may also be referred to as a predefined sequence. For example, transmission of a PSCCH takes precedence over transmission of a PSSCH, or a priority of a PSCCH is higher than a priority of a PSSCH.

Optionally, the performing resource exclusion based on a channel or a signal or a transmission type of the target resource and a channel or a signal or a transmission type of the reserved resource of the second terminal includes:
if a priority of the channel or the signal or the transmission type of the target resource of the first terminal is lower than a priority of the channel or the signal or the transmission type of the reserved resource of the second terminal, excluding all time domain resources included in the target resource, or excluding a time domain resource that is in the target resource and that conflicts with the reserved resource of the second terminal, or excluding a time-frequency resource that is in the target resource and that conflicts with the reserved resource of the second terminal.

For example, on a time domain resource that conflicts with the reserved resource of the second terminal, the first terminal needs to transmit a PSSCH, and the second terminal needs to transmit a PSCCH or a PSFCH, where a priority of the PSCCH or the PSFCH is higher than a priority of the PSSCH. In this case, the conflicting time domain resource is excluded.

Example 4

A transmission resource preconfigured by abase station for multi-slot scheduling is four slots.

In an independent resource selection mode, a first terminal performs sensing in a sensing window, and determines a candidate resource based on a sensing result by using a slot as a granularity.

The first terminal randomly selects one resource from the candidate resource as a resource of a start slot based on the sensing result.

The start slot is used as a reference to determine whether four consecutive slots (that is, a target resource) conflicts with a reserved resource of a second terminal.

If the second slot conflicts with the reserved resource of the second terminal,
if the second terminal performs broadcast transmission (in other words, PSBCH transmission) in the second slot, a resource in the second slot is excluded. Optionally, reserved resources of the first terminal are <the first slot, the third slot, the fourth slot>; and
if the second terminal is denoted as unicast service transmission in the second slot, a resource in the second slot is not excluded. Optionally, reserved resources of the first terminal are <the first slot, the second slot, the third slot, the fourth slot>.

In still another embodiment, the performing resource exclusion based on a conflict resolution method in step 102 includes:

performing resource exclusion based on an average result of interference measurement on multiple time domain resources included in the target resource.

Optionally, the performing resource exclusion based on an average result of interference measurement on multiple time domain resources included in the target resource includes: if the average result of interference measurement is greater than a third threshold, excluding all time domain resources included in the target resource.

Example 5

A transmission resource preconfigured by a base station for multi-slot scheduling required by beam sweeping is four slots.

The first terminal performs sensing in a sensing window in an independent resource selection mode to obtain an average interference result of the four slots. Resource exclusion is performed based on a sensing result by using four slots as a granularity to determine a candidate resource.

The first terminal randomly selects one resource of four slots from the candidate resources as the reserved resource of the first terminal based on the sensing result.

In still another embodiment, the performing resource exclusion based on a conflict resolution method in step 102 includes:

performing resource exclusion based on a resource type of the target resource and a resource type of the reserved resource of the second terminal; where
the resource type includes an initial transmission resource or a retransmission resource.

Optionally, the performing resource exclusion based on a resource type of the target resource and a resource type of the reserved resource of the second terminal includes:

if a time domain resource that is in the target resource and that conflicts with the reserved resource of the second terminal is a retransmission resource of the first terminal, excluding all time domain resources included in the target resource, or excluding the conflicting time domain resource, or excluding a conflicting time-frequency resource.

It should be noted that, if retransmission of the second terminal on the retransmission resource succeeds, the resource may be released.

Optionally, the performing resource exclusion based on a resource type of the target resource and a resource type of the reserved resource of the second terminal includes:

if a resource type of a time domain resource that is in the target resource and that conflicts with the reserved resource of the second terminal is the same as the resource type of the reserved resource of the second terminal, further performing resource exclusion based on at least one of the following information:

QoS on the conflicting time domain resource;
an interference measurement result on the conflicting time domain resource;
a channel quality measurement result on the conflicting time domain resource;
a priority of a channel or a signal or a transmission type of the conflicting time domain resource; or
an average result of interference measurement on multiple time domain resources included in the target resource.

It should be noted that when the first terminal performs resource exclusion based on the foregoing at least one type of information, a determining criterion of the first terminal is the same as a determining criterion mentioned in another embodiment of the present disclosure, and details are not described herein again.

Example 6

Solution 1

Figure 4:
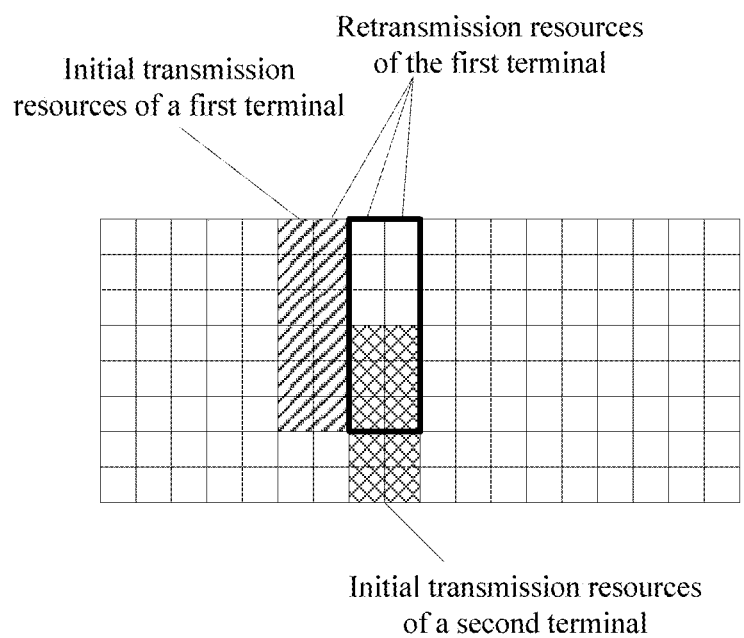
FIG. 4 is a schematic principle diagram 1 of Example 6 in a resource exclusion method according to an embodiment of the present disclosure.

As shown in FIG. 4, four consecutive slots (target resources) are reserved for the first terminal, where the first slot is an initial transmission resource of the first terminal, and the second, third, and fourth slots are retransmission resources. If the third slot and the fourth slot are initial transmission resources of the second terminal, resources in the third and fourth slots of the first terminal are excluded, <the first slot, the second slot> are reserved resources of the first terminal.

Solution 2

Figure 5:
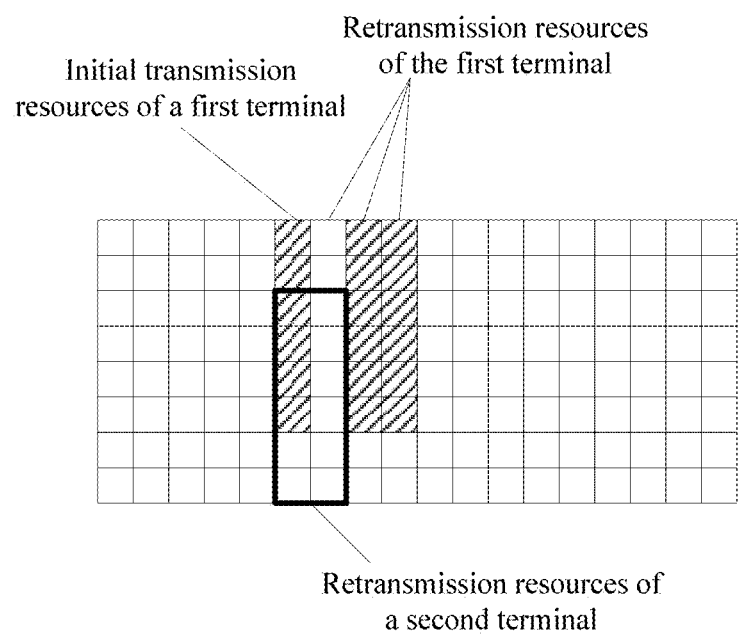
FIG. 5 is a schematic principle diagram 2 of Example 6 in a resource exclusion method according to an embodiment of the present disclosure.

As shown in FIG. 5, four consecutive slots (target resources) are reserved for the first terminal, where the first slot is an initial transmission resource of the first terminal, and the second, third, and fourth slots are retransmission resources. If the first slot and the second slot are initial transmission resources of the second terminal, the first terminal excludes a resource in the second slot, <the first slot, the third slot, the fourth slot> are reserved resources of the first terminal.

Optionally, in the foregoing embodiment of the present disclosure, the performing resource exclusion based on a conflict resolution method in step 102 includes:

based on the conflict resolution method, excluding all time domain resources included in the target resource, or excluding a time domain resource that is in the target resource and that conflicts with the reserved resource of the second terminal, or excluding a time-frequency resource that is in the target resource and that conflicts with the reserved resource of the second terminal;

or performing, based on the conflict resolution method, puncturing or rate matching on a time-frequency resource that is in the target resource and that conflicts with the reserved resource of the second terminal.

Optionally, in the foregoing embodiment of the present disclosure, step 102 includes:

performing resource exclusion based on the conflict resolution method, and determining that a time domain resource remained after exclusion is performed is the candidate resource of the first terminal or the reserved resource of the first terminal; or performing resource exclusion based on the conflict resolution method, selecting N available time domain resources from remaining time domain resources, and determining that the selected N time domain resources are the candidate resource of the first terminal or the reserved resource of the first terminal, where N is an integer greater than or equal to 1. N is a quantity of resources in multi-resource scheduling. For example, N is equal to 4 in four-slot scheduling. Optionally, N available time domain resources are N available consecutive time domain resources.

Example 7

A transmission resource preconfigured by a base station for multi-slot scheduling required by beam sweeping is four slots.

In an independent resource selection mode, a first terminal performs sensing in a sensing window, and determines a candidate resource based on a sensing result by using a slot as a granularity.

The first terminal randomly selects one resource from the candidate resource as a resource of a start slot based on the sensing result.

The start slot is used as a reference, and four candidate slots are successively selected as reserved resources of the first terminal.

Figure 6:
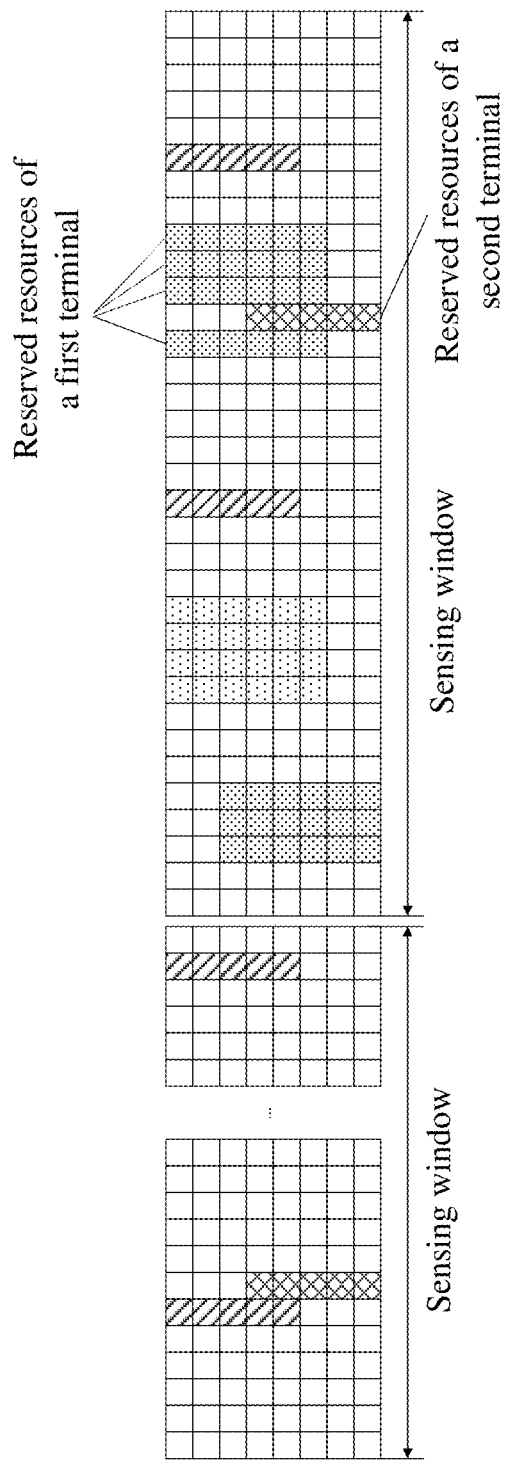
FIG. 6 is a schematic principle diagram of Example 7 in a resource exclusion method according to an embodiment of the present disclosure.

As shown in FIG. 6, if the second slot is the reserved resource of the second terminal, the first terminal excludes a resource in the second slot. If the third slot, the fourth slot, and the fifth slot are all candidate resources, <the first slot, the third slot, the fourth slot, the fifth slot> are used as reserved resources of the first terminal.

It should be noted that in the foregoing embodiments of the present disclosure, the start slot is used as a reference, and that the start slot is used as a reference is only in an optional implementation. In another optional implementation, an end slot is used as a reference, and to meet a latency requirement in actual application, the end slot may be considered as a reference point.

In the foregoing example, in the foregoing embodiment of the present disclosure, after the reserved resource of the first terminal is determined, the method further includes:
sending indication information of the reserved resource, where the indication information is used to indicate at least one of the following information:
a start location of the reserved resource;
an end location of the reserved resource;
a quantity of time domain resources in the reserved resource, for example, a quantity of slots in multi-slot; or
a bitmap indication of the reserved resource, for example, a bitmap indicates an available resource in multi-slot.

In a case of a resource conflict, the conflict resolution method used by the terminal is, for example, excluding a conflicting time domain resource or a conflicting time-frequency resource in configured grant; or excluding all time domain resources in the target resource in beam sweeping.

The first terminal may send the indication information to a third terminal in direct communication with the first terminal by using sidelink control information. The third terminal may determine the reserved resource of the first terminal based on the indication information, to receive data on the corresponding resource.

Optionally, the method further includes:
obtaining at least one of the following information predefined in a protocol, configured by a network or a terminal, or preconfigured by a network or a terminal:
a quantity of time domain resources included in the reserved resource of the first terminal, for example, a quantity of slots in multi-slot; or
the conflict resolution method used by the terminal in a case of a resource conflict, for example, excluding a conflicting time domain resource or a conflicting time-frequency resource in configured grant, or excluding all time domain resources in the target resource in beam sweeping.

The network configuration may be a radio resource control (RRC) indication, a downlink control information (DCI) indication, or a sidelink control information (SCI) scheduling indication.

In conclusion, in the foregoing embodiment of the present disclosure, when the first terminal needs to reserve multiple time domain resources, and the time domain resources that need to be reserved conflict with the reserved resource of the second terminal, a conflict is processed based on the conflict resolution method provided in the embodiments of the present disclosure, so that intra-system interference can be reduced, and system efficiency can be improved.

Figure 7:
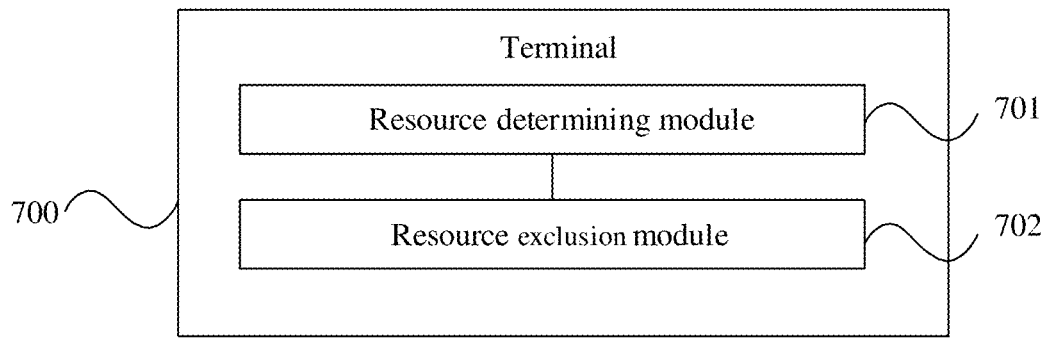
FIG. 7 is a schematic structural diagram 1 of a terminal according to an embodiment of the present disclosure.

As shown in FIG. 7, an embodiment of the present disclosure further provides a terminal 700, where the terminal is a first terminal and includes:
a resource determining module 701, configured to determine at least one target resource, where each target resource includes at least one time domain resource; and
a resource exclusion module 702, configured to: in a case where the target resource conflicts with a reserved resource of a second terminal in time domain, perform resource exclusion based on a conflict resolution method, and determine a candidate resource of the first terminal or a reserved resource of the first terminal; where
the conflict resolution method includes at least one of a conflict resolution method predefined in a protocol, a conflict resolution method preconfigured by a network, a conflict resolution method configured by a network, or a conflict resolution method configured by a terminal.

Optionally, in the foregoing embodiment of the present disclosure, a resource granularity of the time domain resource is any one of the following:
one or more slots;
one or more subframes;
one or more symbols; and
one or more time domain patterns.

Optionally, in the foregoing embodiment of the present disclosure, when resource exclusion is performed based on the conflict resolution method, a resource granularity of resource exclusion is any one of the following:
one or more slots;
one or more subframes;
one or more symbols;
one or more time domain patterns;
a maximum resource granularity in a resource granularity of the reserved resource of the first terminal and a resource granularity of the reserved resource of the second terminal;
a minimum resource granularity in the resource granularity of the reserved resource of the first terminal and the resource granularity of the reserved resource of the second terminal; and the resource granularity of the reserved resource of the first terminal.

Optionally, in the foregoing embodiment of the present disclosure, the resource exclusion module includes:
a first resource exclusion sub-module, configured to: exclude all time domain resources included in the target resource, or exclude a time domain resource that is in the target resource and that conflicts with the reserved resource of the second terminal, or exclude a time-frequency resource that is in the target resource and that conflicts with the reserved resource of the second terminal.

Optionally, in the foregoing embodiment of the present disclosure, the resource exclusion module includes:
a second resource exclusion sub-module, configured to perform resource exclusion based on QoS of the target resource and QoS of the reserved resource of the second terminal.

Optionally, in the foregoing embodiment of the present disclosure, the second resource exclusion sub-module includes:
  a first resource exclusion unit, configured to: if the QoS of the target resource of the first terminal is lower than the QoS of the reserved resource of the second terminal, exclude all time domain resources included in the target resource, or exclude a time domain resource that is in the target resource and that conflicts with the reserved resource of the second terminal, or exclude a time-frequency resource that is in the target resource and that conflicts with the reserved resource of the second terminal.

Optionally, in the foregoing embodiment of the present disclosure, the resource exclusion module includes:
  a third resource exclusion sub-module, configured to perform resource exclusion based on a measurement result of a time domain resource that is in the target resource and that conflicts with the reserved resource of the second terminal;
  where the measurement result is an interference measurement result or a channel quality measurement result.

Optionally, in the foregoing embodiment of the present disclosure, the third resource exclusion sub-module includes:
  a second resource exclusion unit, configured to: in a case where the measurement result is an interference measurement result, if an interference measurement result on the conflicting time domain resource is greater than a first threshold, exclude all time domain resources included in the target resource, or exclude the conflicting time domain resource, or exclude a conflicting time-frequency resource; and
  a third resource exclusion unit, configured to: in a case where the measurement result is a channel quality measurement result, if a channel quality measurement result on the conflicting time domain resource is less than a second threshold, exclude all time domain resources included in the target resource, or exclude the conflicting time domain resource, or exclude a conflicting time-frequency resource.

Optionally, in the foregoing embodiment of the present disclosure, the resource exclusion module includes:
  a fourth resource exclusion sub-module, configured to perform resource exclusion based on a channel or a signal or a transmission type of the target resource and a channel or a signal or a transmission type of the reserved resource of the second terminal; where
  a priority of the channel or the signal or the transmission type is predefined in a protocol, or preconfigured by a network or a terminal, or configured by a network or a terminal.

Optionally, in the foregoing embodiment of the present disclosure, the fourth resource exclusion sub-module includes:
  a fourth resource exclusion unit, configured to: if a priority of the channel or the signal or the transmission type of the target resource of the first terminal is lower than a priority of the channel or the signal or the transmission type of the reserved resource of the second terminal, exclude all time domain resources included in the target resource, or exclude a time domain resource that is in the target resource and that conflicts with the reserved resource of the second terminal, or exclude a time-frequency resource that is in the target resource and that conflicts with the reserved resource of the second terminal.

Optionally, in the foregoing embodiment of the present disclosure, the resource exclusion module includes:
  a fifth resource exclusion sub-module, configured to perform resource exclusion based on an average result of interference measurement on multiple time domain resources included in the target resource.

Optionally, in the foregoing embodiment of the present disclosure, the fifth resource exclusion sub-module includes:
  a fifth resource exclusion unit, configured to: if the average result of interference measurement is greater than a third threshold, exclude all time domain resources included in the target resource.

Optionally, in the foregoing embodiment of the present disclosure, the resource exclusion module includes:
  a sixth resource exclusion sub-module, configured to perform resource exclusion based on a resource type of the target resource and a resource type of the reserved resource of the second terminal; where
  the resource type includes an initial transmission resource or a retransmission resource.

Optionally, in the foregoing embodiment of the present disclosure, the sixth resource exclusion sub-module includes:
  a sixth resource exclusion unit, configured to: if a time domain resource that is in the target resource and that conflicts with the reserved resource of the second terminal is a retransmission resource of the first terminal, exclude all time domain resources included in the target resource, or exclude the conflicting time domain resource, or exclude a conflicting time-frequency resource.

Optionally, in the foregoing embodiment of the present disclosure, the sixth resource exclusion sub-module includes:
  a seventh resource exclusion unit, configured to: if a resource type of a time domain resource that is in the target resource and that conflicts with the reserved resource of the second terminal is the same as the resource type of the reserved resource of the second terminal, further perform resource exclusion based on at least one of the following information:
  QoS on the conflicting time domain resource;
  an interference measurement result on the conflicting time domain resource;
  a channel quality measurement result on the conflicting time domain resource;
  a priority of a channel or a signal or a transmission type of the conflicting time domain resource; or
  an average result of interference measurement on multiple time domain resources included in the target resource.

Optionally, in the foregoing embodiment of the present disclosure, the resource exclusion module includes:
  a seventh resource exclusion sub-module, configured to:
    based on the conflict resolution method, exclude all time domain resources included in the target resource, or exclude a time domain resource that is in the target resource and that conflicts with the reserved resource of the second terminal, or exclude a time-frequency resource that is in the target resource and that conflicts with the reserved resource of the second terminal; or
    perform, based on the conflict resolution method, puncturing or rate matching on a time-frequency resource that is in the target resource and that conflicts with the reserved resource of the second terminal.

Optionally, in the foregoing embodiment of the present disclosure, the resource exclusion module includes:

an eighth resource exclusion sub-module, configured to: perform resource exclusion based on a conflict resolution method, and determine that a time domain resource remained after exclude is performed is the candidate resource of the first terminal or the reserved resource of the first terminal; or perform resource exclusion based on the conflict resolution method, select N available time domain resources from remaining time domain resources, and determine that the selected N time domain resources are the candidate resource of the first terminal or the reserved resource of the first terminal, where N is an integer greater than or equal to 1.

Optionally, in the foregoing embodiment of the present disclosure, the terminal further includes:

a selection module, configured to select the reserved resource of the first terminal from the determined candidate resource of the first terminal.

Optionally, in the foregoing embodiment of the present disclosure, the terminal further includes:

an indication sending module, configured to send indication information of the reserved resource, where the indication information is used to indicate at least one of the following information:

a start location of the reserved resource;

an end location of the reserved resource;

a quantity of time domain resources in the reserved resource;

a bitmap indication of the reserved resource; or a conflict resolution method used by the terminal in a case of a resource conflict.

Optionally, in the foregoing embodiment of the present disclosure, the terminal further includes:

an information obtaining module, configured to obtain at least one of the following information predefined in a protocol, configured by a network or a terminal, or preconfigured by a network or a terminal:

a quantity of time domain resources included in the reserved resource of the first terminal; or a conflict resolution method used by the terminal in a case of a resource conflict.

The terminal provided in this embodiment of the present disclosure can implement processes implemented by the terminal in the method embodiments of FIG. 1 to FIG. 6. To avoid repetition, details are not described herein again.

In the embodiments of the present disclosure, when a target resource of a first terminal that includes at least one time domain resource conflicts with a reserved resource of a second terminal in time domain, resource exclusion is performed based on a predefined or preconfigured or configured conflict resolution method, to determine a candidate resource or a reserved resource of the first terminal, so that conflict resolution for a multi-resource scheduling manner can be implemented, to meet a service requirement of multi-resource scheduling and improve system efficiency.

It should be noted that the terminal provided in this embodiment of the present disclosure is a terminal that can perform the foregoing resource exclusion method. Therefore, all embodiments of the foregoing resource exclusion method are applicable to the terminal, and a same or similar beneficial effect can be achieved.

Figure 8:
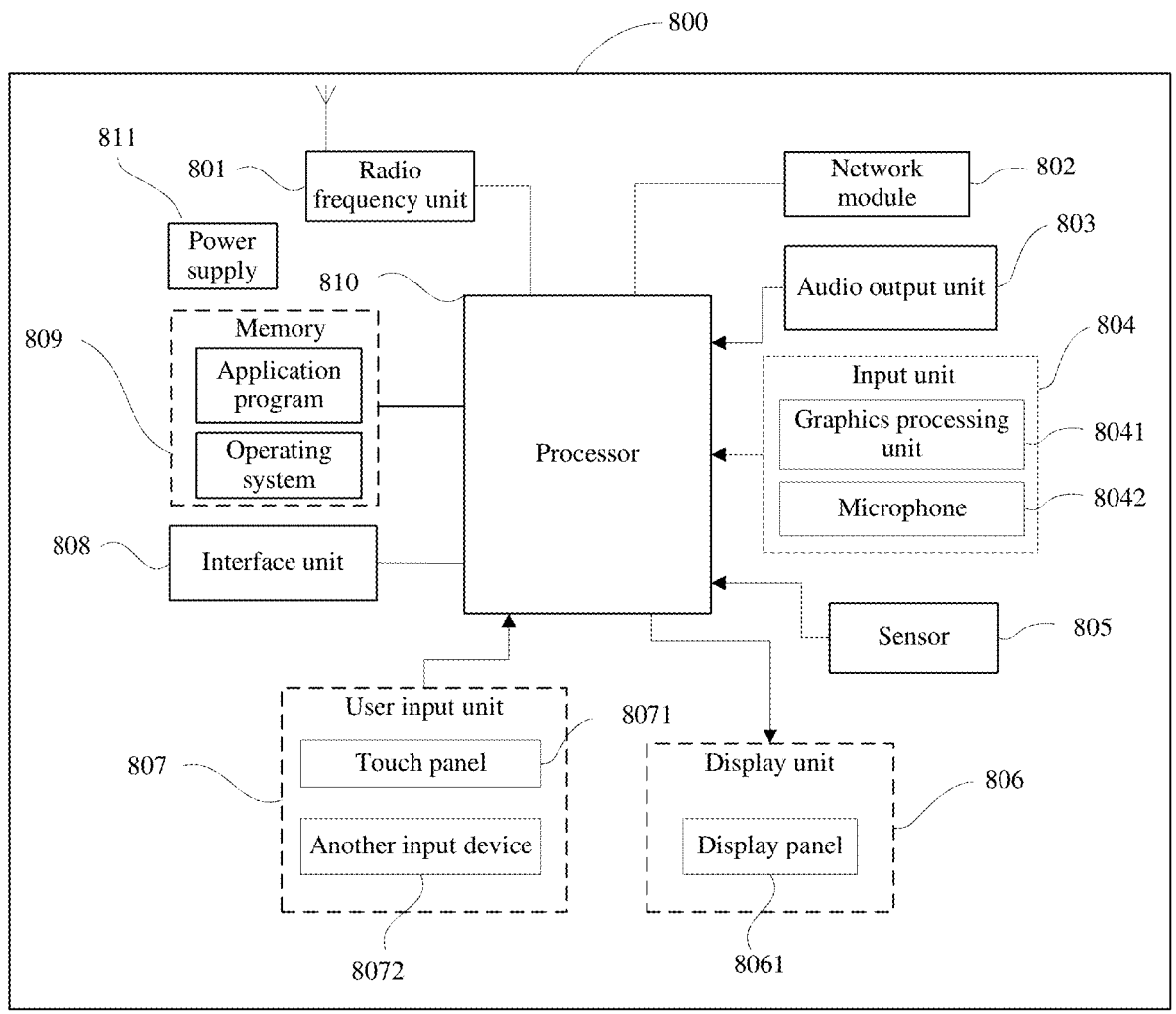
FIG. 8 is a schematic structural diagram 2 of a terminal according to an embodiment of the present disclosure.

FIG. 8 is a schematic structural diagram of hardware of a terminal implementing embodiments of the present disclosure. The terminal 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components.

Those skilled in the art may understand that the terminal structure shown in FIG. 8 does not constitute a limitation to the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 810 is configured to: determine at least one target resource, where each target resource includes at least one time domain resource; and In a case where the target resource conflicts with a reserved resource of a second terminal in time domain, perform resource exclusion based on a conflict resolution method, and determine a candidate resource of the first terminal or a reserved resource of the first terminal; where the conflict resolution method includes at least one of a conflict resolution method predefined in a protocol, a conflict resolution method preconfigured by a network, a conflict resolution method configured by a network, or a conflict resolution method configured by a terminal.

In the embodiments of the present disclosure, when a target resource of a first terminal that includes at least one time domain resource conflicts with a reserved resource of a second terminal in time domain, resource exclusion is performed based on a predefined or preconfigured or configured conflict resolution method, to determine a candidate resource or a reserved resource of the first terminal, so that conflict resolution for a multi-resource scheduling manner can be implemented, to meet a service requirement of multi-resource scheduling and improve system efficiency.

It should be noted that the terminal provided in this embodiment of the present disclosure is a terminal that can perform the foregoing resource exclusion method. Therefore, all embodiments of the foregoing resource exclusion method are applicable to the terminal, and a same or similar beneficial effect can be achieved.

It should be understood that, in this embodiment of the present disclosure, the radio frequency unit 801 may be configured to receive and send information or receive and send a signal in a call process. Optionally, after downlink data from a base station is received, the processor 810 processes the downlink data. In addition, uplink data is sent to the base station. Generally, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through wireless communication.

The terminal provides wireless broadband Internet access for a user by using the network module 802, for example, helping the user send and receive an email, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, call signal receiving sound or message receiving sound) related to a specific function performed by the terminal 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042. The graphics processing unit 8041 processes image data of a static picture or a video obtained by an image capturing apparatus (for example, a camera) in a video capturing mode or an image capturing mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. The processed audio data can be converted, in a telephone call mode, into a format that can be sent by the radio frequency unit 801 to a mobile communications base station for output.

The terminal 800 further includes at least one sensor 805, such as a light sensor, a motion sensor, and another sensor. Optionally, the light sensor includes an ambient light sensor and a proximity sensor, where the ambient light sensor can adjust brightness of a display panel 8061 based on brightness of ambient light, and the proximity sensor can turn off the display panel 8061 and/or backlight when the terminal 800 is moved towards the ear. As a type of motion sensor, an accelerometer sensor may detect an acceleration value in each direction (generally, three axes), and detect a value and a direction of gravity when the accelerometer sensor is static, and may be configured to recognize a terminal posture (for example, screen switching between landscape and portrait modes, a related game, or magnetometer posture calibration), and perform a function related to vibration recognition (for example, a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein again.

The display unit 806 is configured to display information entered by a user or information provided for a user. The display unit 806 may include the display panel 8061, and the display panel 8061 may be configured in a form of a liquid crystal display (LCD), an organic light-emitting diode (OLED), or the like.

The user input unit 807 may be configured to receive input digit or character information and generate key signal input related to user setting and function control of the terminal. Optionally, the user input unit 807 includes a touch panel 8071 and another input device 8072. The touch panel 8071, also referred to as a touchscreen, may collect a touch operation performed by the user on or near the touch panel 8071 (for example, an operation performed by the user on or near the touch panel 8071 by using any suitable object or accessory such as a finger or a stylus). The touch panel 8071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 810, and can receive and execute a command sent by the processor 810. In addition, the touch panel 8071 may be implemented by using a plurality of types such as a resistive type, a capacitive type, an infrared ray, and a surface acoustic wave. The user input unit 807 may include another input device 8072 in addition to the touch panel 8071. Optionally, the other input devices 8072 may include but are not limited to a physical keyboard, a function key (such as a volume control key or a power on/off key), a trackball, a mouse, a joystick, and the like. Details are not described herein.

Optionally, the touch panel 8071 may cover the display panel 8061. After detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 8, the touch panel 8071 and the display panel 8061 are used as two independent components to implement input and output functions of the terminal. However, in some embodiments, the touch panel 8071 and the display panel 8061 may be integrated to implement the input and output functions of the terminal. This is not specifically limited herein.

The interface unit 808 is an interface for connecting an external apparatus to the terminal 800. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 808 may be configured to receive an input (for example, data information or power) from an external apparatus and transmit the received input to one or more elements in the terminal 800, or transmit data between the terminal 800 and the external apparatus.

The memory 809 may be configured to store software programs and various data. The memory 809 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 809 may include a high-speed random access memory, and may also include a non-volatile memory, such as at least one disk storage device, a flash memory device, or other volatile solid-state memory devices.

The processor 810 is a control center of the terminal, and is connected to all parts of the entire terminal by using various interfaces and lines, and performs various functions of the terminal and processes data by running or executing the software program and/or the module that are stored in the memory 809 and invoking the data stored in the memory 809, to implement overall monitoring on the terminal. The processor 810 may include one or more processing units. Optionally, the processor 810 may be integrated with an application processor and a modem processor. The application processor mainly processes the operating system, the user interface, applications, etc. The modem processor mainly processes wireless communication. It may be understood that, alternatively, the modem processor may not be integrated into the processor 810.

The terminal 800 may also include a power supply 811 (for example, a battery) that supplies power to various components. Optionally, the power supply 811 may be logically connected to the processor 810 through a power supply management system, to perform functions of managing charging, discharging, and power consumption through the power supply management system.

In addition, the terminal 800 includes some functional modules not shown. Details are not described herein again.

Optionally, an embodiment of the present disclosure further provides a terminal, including a processor, a memory, and a computer program that is stored in the memory and that can run on the processor. When the computer program is executed by the processor, each process of the foregoing resource exclusion method embodiments can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, the computer program implements each process of the embodiment of the foregoing resource exclusion method, and a same technical effect can be achieved. To avoid repetition, details are not described herein. The non-transitory computer-readable storage medium may be a read-only memory (ROM), a random access memory (RAM), a magnetic disk, a compact disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present invention are described with reference to the accompanying drawings. However, the present invention is not limited to the foregoing specific implementations. The foregoing specific implementations are merely examples, but are not limiting. A person of ordinary skill in the art may make many forms without departing from the objective and the scope of the claims of the present invention, and these forms all fall within the protection scope of the present invention.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A resource exclusion method, comprising:
   determining, by a first terminal, at least one target resource, wherein each target resource comprises at least one time domain resource, and a resource granularity of the at least one time domain resource is a plurality of slots;
   in a case where the target resource conflicts with a reserved resource of a second terminal in time domain, performing, by the first terminal, resource exclusion based on a conflict resolution method; and
   determining, by the first terminal, a candidate resource of the first terminal or a reserved resource of the first terminal; wherein
   the conflict resolution method includes at least one of a conflict resolution method predefined in a protocol, a conflict resolution method preconfigured by a network, a conflict resolution method configured by a network, or a conflict resolution method configured by a terminal;
   wherein the performing, by the first terminal, resource exclusion based on the conflict resolution method comprises:
   performing, by the first terminal, resource exclusion based on quality of service (QoS) of the target resource and QoS of the reserved resource of the second terminal.

2. The method according to claim 1, wherein the performing, by the first terminal, resource exclusion based on the conflict resolution method comprises:
   based on the conflict resolution method, excluding, by the first terminal, all time domain resources comprised in the target resource, or excluding a time domain resource that is in the target resource and that conflicts with the reserved resource of the second terminal, or excluding a time-frequency resource that is in the target resource and that conflicts with the reserved resource of the second terminal; or
   performing, by the first terminal, based on the conflict resolution method, puncturing or rate matching on a time-frequency resource that is in the target resource and that conflicts with the reserved resource of the second terminal.

3. The method according to claim 1, wherein when resource exclusion is performed, by the first terminal, based on the conflict resolution method, a resource granularity of resource exclusion is the plurality of slots.

4. The method according to claim 1, wherein the performing, by the first terminal, resource exclusion based on the conflict resolution method comprises:
   excluding, by the first terminal, all time domain resources comprised in the target resource; or
   excluding, by the first terminal, a time domain resource that is in the target resource and that conflicts with the reserved resource of the second terminal; or
   excluding, by the first terminal, a time-frequency resource that is in the target resource and that conflicts with the reserved resource of the second terminal.

5. The method according to claim 1, wherein the performing, by the first terminal, resource exclusion based on the conflict resolution method and determining the candidate resource of the first terminal or the reserved resource of the first terminal comprises:
   performing, by the first terminal, resource exclusion based on the conflict resolution method; and
   determining, by the first terminal, that a time domain resource remained after exclusion is performed is the candidate resource of the first terminal or the reserved resource of the first terminal;
   or
   performing, by the first terminal, resource exclusion based on the conflict resolution method;

selecting, by the first terminal, N available time domain resources from remaining time domain resources; and determining, by the first terminal, that the selected N time domain resources are the candidate resource of the first terminal or the reserved resource of the first terminal, wherein N is an integer greater than or equal to 1.

6. The method according to claim 1, wherein the performing, by the first terminal, resource exclusion based on QoS of the target resource and QoS of the reserved resource of the second terminal comprises:

if the QoS of the target resource of the first terminal is lower than the QoS of the reserved resource of the second terminal, excluding, by the first terminal, all time domain resources comprised in the target resource, or excluding a time domain resource that is in the target resource and that conflicts with the reserved resource of the second terminal, or excluding a time-frequency resource that is in the target resource and that conflicts with the reserved resource of the second terminal.

7. The method according to claim 1, wherein after the performing, by the first terminal, resource exclusion based on the conflict resolution method and determining, by the first terminal, the candidate resource of the first terminal, the method further comprises:

selecting, by the first terminal, the reserved resource of the first terminal from the determined candidate resource of the first terminal.

8. The method according to claim 1, further comprising:
sending, by the first terminal, indication information of the reserved resource, wherein the indication information is used to indicate at least one of:
a start location of the reserved resource;
an end location of the reserved resource;
a quantity of time domain resources in the reserved resource;
a bitmap indication of the reserved resource; or
a conflict resolution method used by the terminal in a case of a resource conflict.

9. The method according to claim 1, further comprising:
obtaining, by the first terminal, at least one of following information predefined in a protocol, configured by a network or a terminal, or preconfigured by a network or a terminal:
a quantity of time domain resources comprised in the reserved resource of the first terminal; or
a conflict resolution method used by the terminal in a case of a resource conflict.

10. A non-transitory computer-readable storage medium, the non-transitory computer-readable storage medium stores a computer program, wherein the computer program, when executed by a processor, causes the processor to perform:

determining at least one target resource, wherein each target resource comprises at least one time domain resource;

in a case where the target resource conflicts with a reserved resource of a second terminal in time domain, performing resource exclusion based on a conflict resolution method; and determining a candidate resource of a first terminal or a reserved resource of the first terminal; wherein the conflict resolution method includes at least one of a conflict resolution method predefined in a protocol, a conflict resolution method preconfigured by a network, a conflict resolution method configured by a network, or a conflict resolution method configured by a terminal;

wherein the performing resource exclusion based on the conflict resolution method comprises:

performing, by the first terminal, resource exclusion based on quality of service (QoS) of the target resource and QoS of the reserved resource of the second terminal.

11. The non-transitory computer-readable storage medium according to claim 10, wherein the computer program, when executed by the processor, causes the processor to further perform:

sending indication information of the reserved resource, wherein the indication information is used to indicate at least one of:
a start location of the reserved resource;
an end location of the reserved resource;
a quantity of time domain resources in the reserved resource;
a bitmap indication of the reserved resource; or
a conflict resolution method used by the terminal in a case of a resource conflict.

12. The non-transitory readable medium according to claim 10, wherein the computer program, when executed by a processor, causes the processor to further perform:
excluding all time domain resources comprised in the target resource; or
excluding a time domain resource that is in the target resource and that conflicts with the reserved resource of the second terminal; or
excluding a time-frequency resource that is in the target resource and that conflicts with the reserved resource of the second terminal.

13. The non-transitory readable medium according to claim 10, wherein the computer program, when executed by a processor, causes the processor to perform:
if the QoS of the target resource of the first terminal is lower than the QoS of the reserved resource of the second terminal, excluding all time domain resources comprised in the target resource, or excluding a time domain resource that is in the target resource and that conflicts with the reserved resource of the second terminal, or excluding a time-frequency resource that is in the target resource and that conflicts with the reserved resource of the second terminal.

14. The non-transitory readable medium according to claim 10, wherein the computer program, when executed by a processor, causes the processor to further perform:
selecting the reserved resource of the first terminal from the determined candidate resource of the first terminal.

15. A terminal, comprising: a processor, a memory, and a computer program that is stored in the memory and executable on the processor, wherein the computer program, when executed by the processor, causes the terminal device to perform:
determining at least one target resource, wherein each target resource comprises at least one time domain resource, and a resource granularity of the at least one time domain resource is a plurality of slots;
in a case where the target resource conflicts with a reserved resource of a second terminal in time domain, performing resource exclusion based on a conflict resolution method; and
determining a candidate resource of a first terminal or a reserved resource of the first terminal; wherein
the conflict resolution method includes at least one of a conflict resolution method predefined in a protocol, a conflict resolution method preconfigured by a network, a conflict resolution method configured by a network, or a conflict resolution method configured by a terminal;

wherein the computer program, when executed by the processor, causes the terminal device to perform:

performing resource exclusion based on quality of service (QoS) of the target resource and QoS of the reserved resource of the second terminal.

16. The terminal according to claim 15, wherein the computer program, when executed by the processor, causes the terminal device to further perform:
   excluding all time domain resources comprised in the target resource; or
   excluding a time domain resource that is in the target resource and that conflicts with the reserved resource of the second terminal; or
   excluding a time-frequency resource that is in the target resource and that conflicts with the reserved resource of the second terminal.

17. The terminal according to claim 15, wherein the computer program, when executed by the processor, causes the terminal device to perform:
   if the QoS of the target resource of the first terminal is lower than the QoS of the reserved resource of the second terminal, excluding all time domain resources comprised in the target resource, or excluding a time domain resource that is in the target resource and that conflicts with the reserved resource of the second terminal, or excluding a time-frequency resource that is in the target resource and that conflicts with the reserved resource of the second terminal.

18. The terminal according to claim 15, wherein the computer program, when executed by the processor, causes the terminal to further perform:
   sending indication information of the reserved resource, wherein the indication information is used to indicate at least one of following information:
   a start location of the reserved resource;
   an end location of the reserved resource;
   a quantity of time domain resources in the reserved resource;
   a bitmap indication of the reserved resource; or
   a conflict resolution method used by the terminal in a case of a resource conflict.

19. The terminal according to claim 15, wherein the computer program, when executed by the processor, causes the terminal to further perform:
   obtaining at least one of following information predefined in a protocol, configured by a network or a terminal, or preconfigured by a network or a terminal:
   a quantity of time domain resources comprised in the reserved resource of the first terminal; or
   a conflict resolution method used by the terminal in a case of a resource conflict.

20. The terminal according to claim 15, wherein the computer program, when executed by the processor, causes the terminal device to further perform:
   selecting the reserved resource of the first terminal from the determined candidate resource of the first terminal.

* * * * *